(12) United States Patent
Bagley

(10) Patent No.: US 8,757,602 B2
(45) Date of Patent: Jun. 24, 2014

(54) EXPANDING COLANDER

(75) Inventor: Justin Bagley, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 177 days.

(21) Appl. No.: 13/365,967

(22) Filed: Feb. 3, 2012

(65) Prior Publication Data

US 2012/0261327 A1  Oct. 18, 2012

Related U.S. Application Data

(63) Continuation-in-part of application No. 13/047,571, filed on Mar. 14, 2011, now Pat. No. 8,360,407.

(60) Provisional application No. 61/313,587, filed on Mar. 12, 2010.

(51) Int. Cl.
  *B23Q 3/00* (2006.01)
  *B01D 35/30* (2006.01)
  *B65D 6/00* (2006.01)

(52) U.S. Cl.
  USPC .................. 269/15; 210/232; 220/666; 220/6

(58) Field of Classification Search
  USPC ........................................ 269/15; 220/6, 666
  See application file for complete search history.

(56) References Cited

U.S. PATENT DOCUMENTS

| | | | |
|---|---|---|---|
| 1,016,249 A | 2/1912 | Comtois | |
| 1,048,546 A | 12/1912 | Ketcham | |
| 1,247,006 A | 11/1917 | Reardon | |
| 1,310,773 A | 7/1919 | Willis | |
| 1,669,284 A | 8/1926 | Chetham | |
| 1,675,855 A | 10/1927 | Kogler et al. | |
| 1,688,846 A | 10/1927 | Andrews | |
| 1,874,498 A | 10/1930 | Glenny | |
| 1,950,378 A | 5/1932 | Andrews | |
| 2,006,566 A | 1/1934 | Zimmer | |
| 2,264,238 A | 11/1941 | Burdwood | |
| 2,464,921 A | 5/1944 | Chandler | |
| 2,391,215 A | 6/1944 | Zabel et al. | |
| 2,456,912 A | 3/1945 | Burrows | |
| 2,520,382 A | 8/1946 | Conrad et al. | |
| 2,732,696 A | 1/1953 | Baker | |
| 2,808,938 A | 7/1953 | Glover | |
| 3,300,048 A | 4/1964 | Pollock | |
| D199,320 S | 10/1964 | Swett | |

(Continued)

FOREIGN PATENT DOCUMENTS

| | | |
|---|---|---|
| CA | 2602047 | 9/2008 |
| CN | 201119807 | 9/2008 |

(Continued)

OTHER PUBLICATIONS

"One Source for Silicone Innovation," Dexas International, Ltd; www.dexas.com; 1 page. 2006.

(Continued)

*Primary Examiner* — Lee D Wilson
*Assistant Examiner* — Nirvana Deonauth
(74) *Attorney, Agent, or Firm* — Lowe Graham Jones PLLC

(57) ABSTRACT

A colander includes a front portion, an intermediate portion, and a back portion, with the intermediate portion being formed from a resilient material. The front portion is sized to be smaller than the back portion, allowing the front portion to be pressed into the back portion, folding the intermediate portion, for compact storage.

18 Claims, 6 Drawing Sheets

(56) References Cited

U.S. PATENT DOCUMENTS

| | | |
|---|---|---|
| 3,170,875 A | 2/1965 | Swett |
| D237,032 S | 10/1975 | Montesi |
| D244,827 S | 6/1977 | Nevai |
| 4,075,105 A | 2/1978 | Steiner et al. |
| 4,220,534 A | 9/1980 | Perry |
| D259,535 S | 6/1981 | Daenen |
| D272,972 S | 3/1984 | De Coster |
| D286,490 S | 11/1986 | Carlson |
| 4,622,146 A | 11/1986 | O'Brien |
| 5,035,800 A | 7/1991 | Kopach |
| D346,725 S | 5/1994 | Kolada |
| D359,202 S | 6/1995 | Cousins et al. |
| 5,900,293 A | 5/1999 | Zettle |
| 5,992,676 A | 11/1999 | Tsai |
| D433,884 S | 11/2000 | Fujimoto |
| D444,039 S | 6/2001 | Tong |
| D469,667 S | 2/2003 | Burton |
| 6,547,080 B1 | 4/2003 | Guard |
| 6,758,348 B2 | 7/2004 | Adkins |
| D502,847 S | 3/2005 | Leonori |
| D503,313 S | 3/2005 | Shamoon |
| D514,764 S | 2/2006 | Kumagai |
| D558,536 S | 1/2008 | Curtin |
| 7,325,694 B2 | 2/2008 | Bushey |
| 7,678,271 B2 | 3/2010 | Curtin |
| 2003/0217649 A1 | 11/2003 | Leonori |
| 2006/0060522 A1 | 3/2006 | Bushey |
| 2006/0096929 A1 | 5/2006 | Repp et al. |
| 2007/0181489 A1 | 8/2007 | Lee |
| 2007/0251874 A1 | 11/2007 | Stewart |
| 2008/0011671 A1 | 1/2008 | Syrkos |

FOREIGN PATENT DOCUMENTS

| | | |
|---|---|---|
| CN | 201167889 | 12/2008 |
| EP | 1764017 | 3/2007 |
| GB | 2028675 | 3/1980 |
| JP | 09-192031 | 7/1997 |
| WO | 2006054168 | 5/2006 |

OTHER PUBLICATIONS

"Strainer," Normann Copenhagen, Good Design 2005; www.normann-copenhagen.com; 1 page. Printed Jul. 13, 2006.

"The Normann Collapsible Colander," Smart Stuff; www.smartstuff.se; 2 pages. Printed Jul. 13, 2006.

"Prepology Set of 3 Silicone Collapsible Colanders," QVC, www.qvc.com, 5 pages. printed Jul. 5, 2006.

EXPANDING COLANDER

PRIORITY CLAIM

This application is a continuation-in-part of U.S. application Ser. No. 13/047,571, filed Mar. 14, 2011, which claims the benefit of U.S. Provisional Application Ser. No. 61/313,587 filed Mar. 12, 2010; the contents of which are incorporated by reference.

FIELD OF THE INVENTION

This invention relates generally to kitchen devices, particularly including devices for collecting and straining food items.

BACKGROUND OF THE INVENTION

In food preparation, it is often useful to have a cutting board that can be placed on any countertop in order to cut the food items at any desired location without damaging the countertop. The cutting process often separates peels, stems, leaves, cores, or other food scraps that are to be discarded. Because it can be inconvenient to carry the scraps back and forth to a discard container contemporaneously as they are produced, it is useful to have a scrap bin associated with the cutting board. Unfortunately, a cutting board with an attached scrap bin is typically bulky and difficult to store.

A colander for use with food items often also takes up a significant amount of space. A laterally expanding colander would also be desirable.

SUMMARY OF THE INVENTION

A preferred version of the invention includes a cutting board that is configured for use in cutting food items. The cutting board has a generally planar region that can rest on a countertop to enable cutting.

One portion of the cutting board is adapted to attach to a scrap bin, with the scrap bin being selectively attachable or detachable as desired.

In preferred versions the scrap bin is also collapsible, making it even smaller for storage.

In a modified version of the invention, the scrap bin is in the form of a laterally expanding colander, either secured to or separated from the cutting board. In one version, the expanding colander includes a central resilient region allowing two surrounding portions to be compressed toward one other.

These and other examples of the invention will be described in further detail below.

BRIEF DESCRIPTION OF THE DRAWINGS

The preferred versions of the invention are described below and illustrated in the following figures.

DETAILED DESCRIPTION OF THE PREFERRED EMBODIMENT

Figure 1:
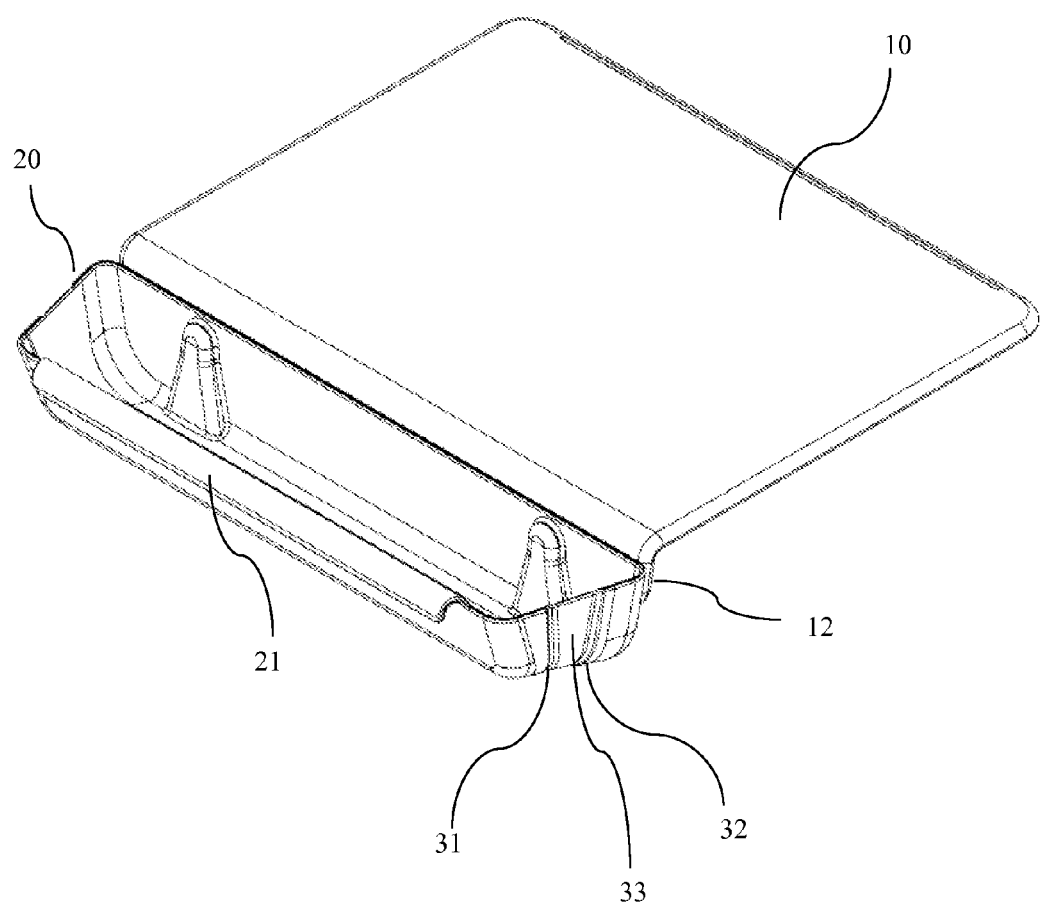
FIG. 1 is a perspective view of a preferred version of a cutting board with scrap bin.
Figure 2:
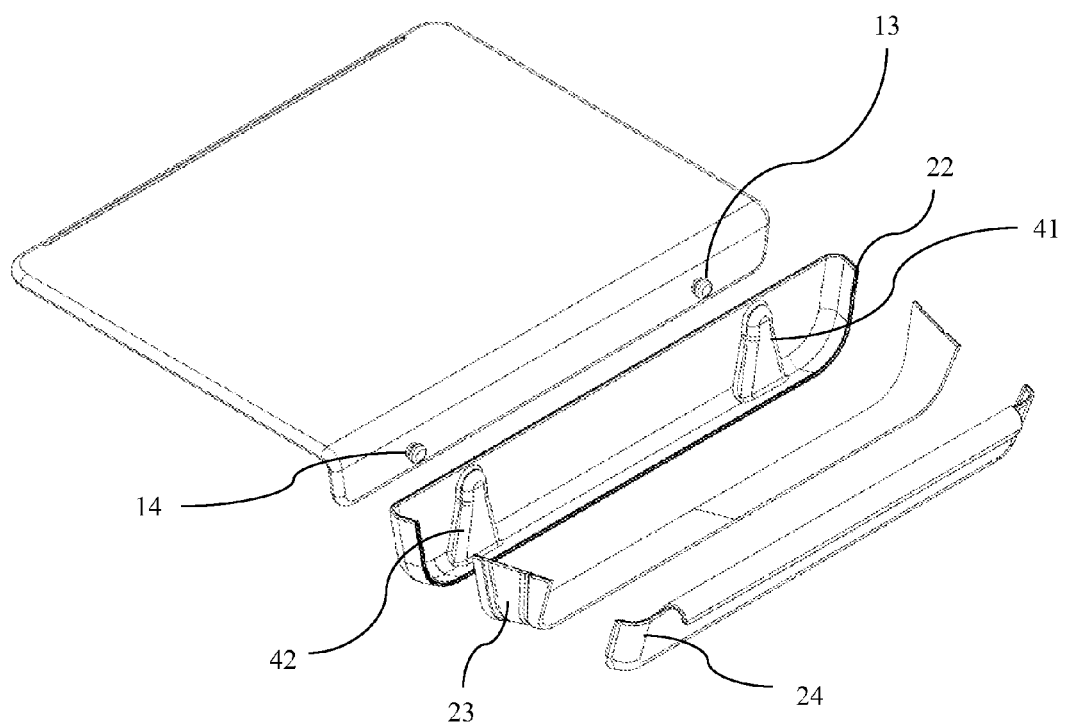
FIG. 2 is an exploded view of a preferred version of a cutting board with scrap bin.

With reference to FIGS. 1-4, the exemplary cutting board includes a planar cutting surface 10. The substantially planar cutting surface is configured to rest on a countertop to provide a surface suitable for cutting foods. The cutting board may be formed from any suitable materials, for example, wood or plastics such as polyethylene. The upper surface of the cutting board should be relatively smooth and planar, while the lower surface should be configured to rest on a horizontal surface such as a countertop. The lower surface may optionally include a layer of resilient material such as a thermoplastic elastomer, or feet made from such a material, to prevent the cutting board from sliding on the countertop.

One portion of the cutting board is configured to attach to a scrap bin. In the version as shown, this is accomplished by providing mounts on a front end of the cutting board. Thus, a front end of the cutting board includes a vertical face 12 that is generally perpendicular to the upper planar surface 10 of the cutting board. Most preferably, the vertical face extends downwardly from the planar cutting board, thereby forming an L shape. The downwardly-depending vertical face can engage an edge of the countertop on which the cutting board rests to ensure that the cutting board is firmly placed along the edge of the countertop.

In the version as shown, the vertical face extends substantially along an entire side of the cutting board, while in other versions of the invention it may extend downward along only a portion of a side. Likewise, in some versions of the invention the downwardly-extending vertical face may be omitted, with a means for mounting the scrap bin being incorporated into an end of the cutting board without a vertical extension.

The cutting board includes one or more scrap bin supports 13, 14 for mounting the scrap bin. In the exemplary version, the supports are in the form of horizontal pins having peripheral flanges to define an annular shoulder to retain the scrap bin as described below.

The scrap bin 20 is constructed to be collapsible and is formed in three sections, including a rigid back section 22, a flexible central section 23, and a rigid front section 24. The rigid back section includes a generally flat back wall that is configured to rest against the generally flat downwardly-depending vertical face of the cutting board. In other versions the front and back sections may also be flexible or semi-rigid.

The back section further includes a means for attachment to the cutting board. In the illustrated version, this is in the form of one or more indentations 41, 42 defining cavities on the back side of the back section 22 and formed to receive the supports 13, 14 extending from the cutting board. The cavities extend inward in a direction from the back section toward the front section when the scrap bin is assembled. A lower portion of the cavity is flared outwardly from side to side, creating a wide skirt that will easily allow the supports to be received within the lower portion of the cavity. An upper portion of the cavity is substantially narrower, having a rounded upper end and a neck formed just below the upper end.

The cavities preferably further include a slot formed in the upper portion of the cavity, the slot being sized to retain the pin of the support but being narrower than the annular flange of the support. The slots thereby provide a shoulder against which the annular flanges will engage to prevent the scrap bin from falling from the cutting board. Accordingly, the bin supports are readily insertable into the lower portion of the cavities. Once inserted into the lower portion of the cavity, the back section is moved downward relative to the cutting board, urging the support upward and into the top portion of the cavity where it is frictionally held in place.

Other attachment means may be used to secure the scrap bin to the cutting board. For example, the scrap bin may have one or more pins or hooks that are insertable into slots formed in the cutting board. Alternatively, tongue and groove, snaps, or other interlocking arrangements may be used.

The center section 23 of the scrap bin is attached to the front and back sections by gluing, over-molding, or other suitable techniques. As shown, the center section includes a pair of living hinges 31, 32 with an intermediate region 33 between them. The central section is preferably formed from silicone or other resilient materials such that the living hinges enable the central section to be folded along the living hinges. Because the living hinges extend generally along the entire length of the central section of the scrap bin, they allow the entirety of the scrap bin to be compressed along the living hinge.

The front section 24 of the scrap bin is also formed from a substantially rigid material such as plastic. The front section 24 has a width that is smaller than the width of the back side, such that the intermediate section is tapered somewhat to define a bin that is substantially trapezoidal in shape when viewed from the top, looking downward upon the planar surface 10 and the bin 20.

Optionally the front section may include a handle 21 to facilitate pulling the scrap bin outward to expand it from the collapsed position. In the illustrated version, the handle is in the form of a curved flange sized to receive the fingertips of a user so that it can be pulled outward.

In use, the cutting board may be placed on a countertop with the vertical edge 12 being adjacent the edge of the countertop. The scrap bin is attached to the cutting board, mounting the receiving cavities onto the supports. If the scrap bin is in the compressed position, it can be expanded by pulling the handle outwardly.

After use, the scrap bin can be separated from the cutting board, emptied, cleaned, and compressed for storage. By pushing the front section 24 toward the back section 22, the front section 24 of the scrap bin is urged into a position inside the central section. The width of the front section 24 is somewhat smaller than the width of the back section 22. Consequently, the movement of the front section toward the back section causes the first living hinge 31 to fold such that an outer lateral surface of the front section is moved toward an outer lateral surface of the central section 23. Likewise, the second living hinge 32 is bent to allow the front section to collapse to a position substantially adjacent the back section.

Figure 3:
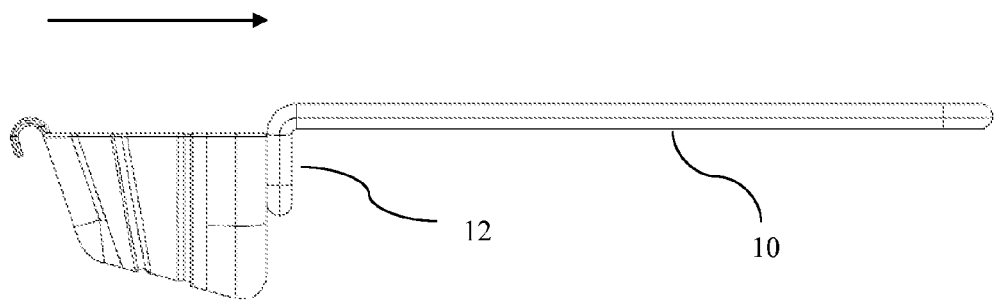
FIG. 3 is a side view of the version illustrated in FIG. 1, shown with the scrap bin expanded.
Figure 4:
FIG. 4 is a side view of the preferred version as illustrated in FIG. 3, shown with the scrap bin collapsed.

The scrap bin may also be collapsed when attached to the cutting board by pressing it inward in the direction of the arrow as illustrated in FIG. 3. After pressing it inward, the bin is collapsed as illustrated in FIG. 4.

Figure 5:
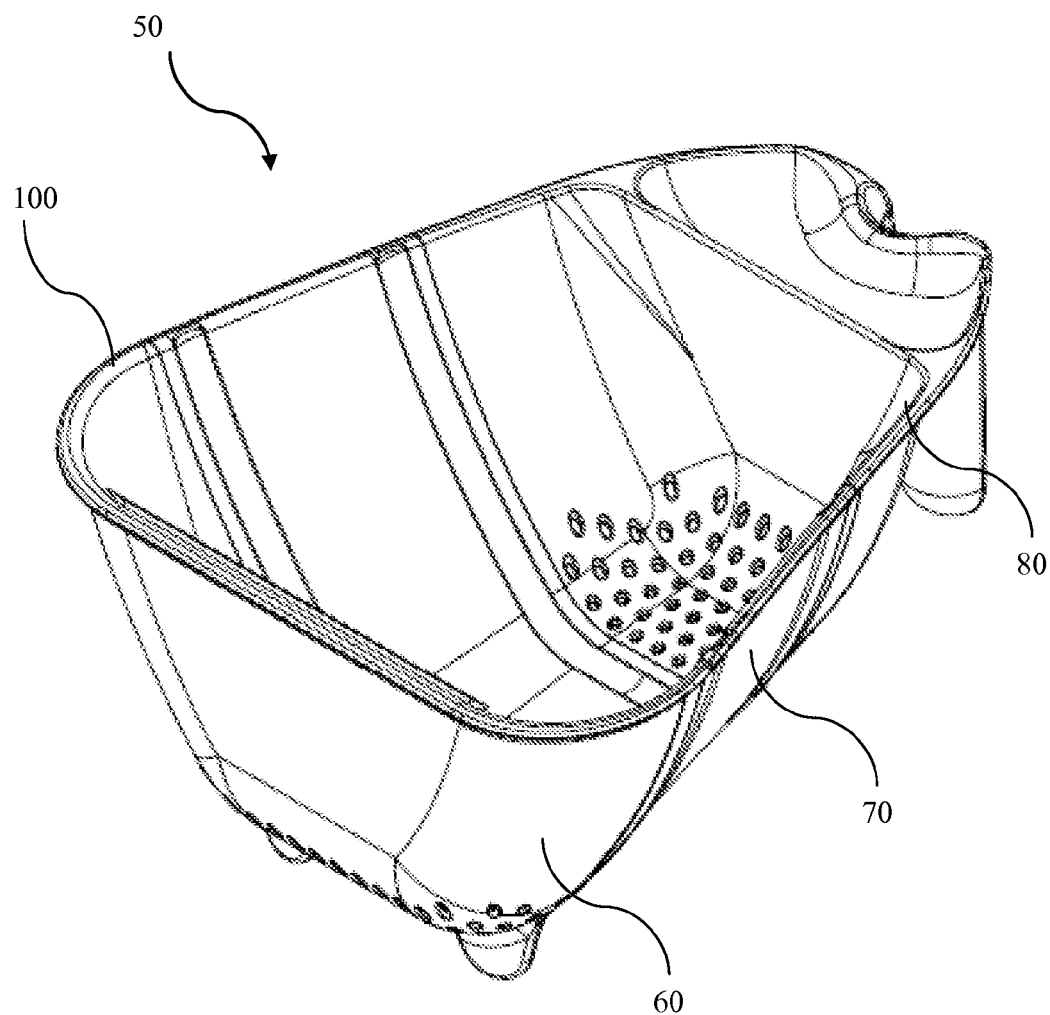
FIG. 5 is a top perspective view of a preferred expanding colander, formed in accordance with the invention.
Figure 6:
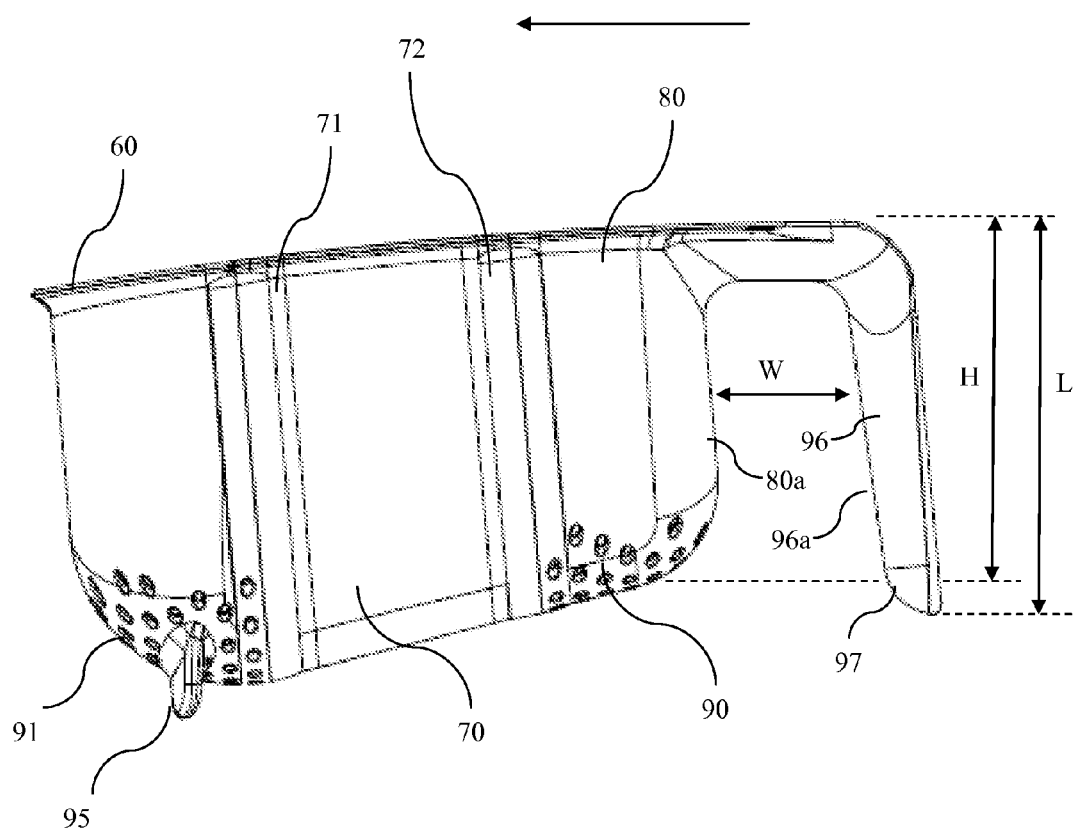
FIG. 6 is a side view of the colander of FIG. 5.
Figure 7:
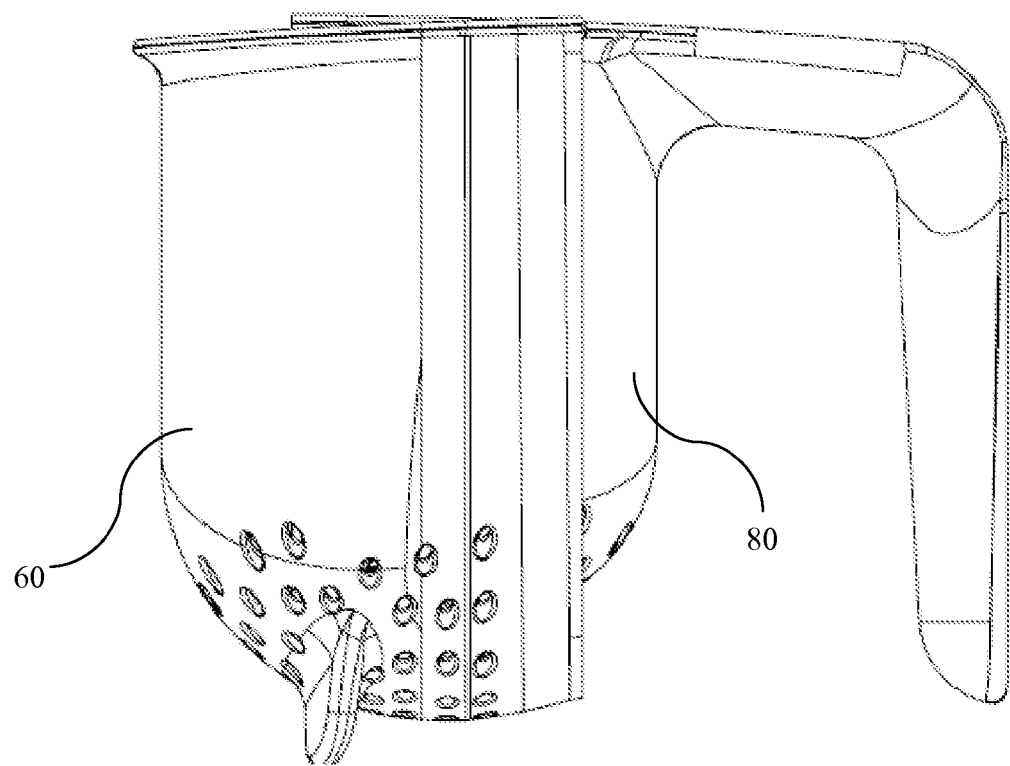
FIG. 7 is a side view of the colander of FIG. 5, shown in the collapsed position.

An alternate version of a collapsible container is shown in FIGS. 5-7. In this version, the container 50 is formed as a colander, though it may be formed without through holes, and in such a version it is much the same as the expanding scrap bin of FIGS. 1-4.

In the configuration of FIGS. 5-7, the container includes a front portion 80, a back portion 60, and a collapsible intermediate portion 70. Most preferably, the front and back portions are formed from a rigid or semi-rigid material such as s plastic material. The intermediate portion 70 is formed from a thermoplastic elastomer such as silicone or some other elastomeric material. In the same fashion as with the scrap bin as described above, the intermediate section is attached to the front and back sections by gluing, over-molding, or other suitable techniques.

As with the scrap bin, the colander expands and compresses laterally. Thus, rather than expanding and compressing in a direction that moves the rim of the container downward toward the base, the first and second portions are moved laterally toward one another. In other words, the front portion 80 moves toward the back portion 60, in the direction of the arrow in FIG. 6 The rim and the base remain in substantially fixed positions with respect to one another during this compression.

In the preferred version, the colander includes an upper rim 100, which as illustrated defines a continuous rim connecting the front portion, back portion, and intermediate portion. A bottom portion of the colander includes a foot 95 suitable for resting on a horizontal surface such as the bottom of a sink. A handle 96 includes a lower end 97, with the length of the handle being such that only the foot 95 and lower end 97 of the handle contact the horizontal surface on which the colander is resting.

With reference to FIG. 6, the interior sidewall 96a of the handle 96 is separated from the exterior sidewall 80a of the front portion 80 by a width W. In the preferred version of the invention, the handle is configured to enable the colander to be supported by a central wall separating a typical kitchen double sink. In this supported position, the main container body of the colander may be suspended over one of the sink bowls, hanging from the sink divider. Accordingly, the width W is preferably one inch such that the double sink separator wall may be received between the handle and the front portion sidewall, in the space defined by the width W. In addition, as noted above, the handle is formed with a length such that the lower end 97 of the handle defines a handle length that is as long or longer than the height of the colander. Thus, again with reference to FIG. 6, the handle 96 preferably is formed with a length L that is as long or longer than the height H of the colander from the rim to the floor of the colander along the exterior sidewall 80a of the front portion 80.

The intermediate portion includes a first living hinge 71 adjacent the interface between the back portion and the intermediate portion, and a second living hinge 72 adjacent the interface between the front portion and the intermediate portion.

As with the scrap bin, the dimensions of the front and back portions are configured such that the front portion fits within the back portion. Thus, at the edge of the front portion adjacent the interface with the intermediate portion, the height and width of the front portion is smaller than the size and width of the back portion at the interface of the back portion and the intermediate portion. Moreover, in the version as illustrated, the height and width of the front portion is smaller than that of the back portion at every location. Consequently, as the front portion is urged toward the back portion it easily fits inside the back portion because the front portion is smaller.

In the expanded positions of FIGS. 5 and 6, the colander is in position for use. Accordingly, it can retain food items such as fruits or vegetables. Water within the colander may be drained through the bottom and out holes 90, 91 formed in the bottom of each of the front portion and the back portion.

When ready for storage, the front portion may be pushed toward the back portion, as shown in FIG. 7. The inward force causes the intermediate section to fold along each of the living hinges, eventually turning the intermediate section inside out at its limit. In the compressed position, at least a portion of the front section and substantially all of the intermediate sections are received within the back section (such that the intermediate portion is not visible in FIG. 7), thereby reducing the overall size of the container.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A collapsible colander, comprising:
a semi rigid or rigid front portion, a semi rigid or rigid back portion located at an opposite end of the front portion, and a horizontally collapsible intermediate portion formed from a resilient material secured between the front portion and the back portion; the collapsible colander having a bottom surface and upwardly extending sidewalls terminating in a rim opposite the bottom surface, at least a portion of the bottom surface, the sidewalls, and the rim being formed from the resilient material; the back portion being larger than the front portion, whereby the collapsible colander is selectively configurable between an expanded position and a laterally collapsed position, the front portion being at least partially received within the back portion in the laterally collapsed position; wherein the front portion and back portion are configured to shift horizontally into the collapsed position.

2. The collapsible colander of claim 1, wherein the collapsible intermediate portion is formed with a first living hinge adjacent the front portion and a second living hinge adjacent the back portion.

3. The collapsible colander of claim 2, wherein the collapsible intermediate position is of substantially uniform thickness between the first living hinge and the second living hinge.

4. The collapsible colander of claim 1, further comprising a plurality of holes formed in the bottom surface.

5. The collapsible colander of claim 4 further comprising a handle formed on the front portion.

6. The collapsible colander of claim 4, further comprising a foot formed on the back portion.

7. A collapsible colander, comprising: a semi rigid or rigid front portion, a semi rigid or rigid back portion located at an opposite end of the front portion, and a horizontally collapsible intermediate portion formed from a resilient material secured between the front portion and the back portion; the collapsible colander having a bottom surface and upwardly extending sidewalls terminating in a rim opposite the bottom surface, at least a portion of the bottom surface, the sidewalls, and the rim being formed from the resilient material; the back portion and the front portion being sized and configured such that the collapsible colander is selectively configurable between an expanded position in which the front portion is relatively distant from the back portion, and a laterally collapsed position in which the front portion is moved relatively closer to the back portion and the front portion is at least partially received within the back portion, the intermediate portion being folded when the collapsible colander is in the collapsed position; wherein the front portion and back portion are configured to shift horizontally into the collapsed position.

8. The collapsible colander of claim 7, wherein the collapsible intermediate portion is formed with a first living hinge adjacent the front portion and a second living hinge adjacent the back portion.

9. The collapsible colander of claim 8, wherein the collapsible intermediate position is of substantially uniform thickness between the first living hinge and the second living hinge.

10. The collapsible colander of claim 7, further comprising a plurality of holes formed in the bottom surface.

11. The collapsible colander of claim 10 further comprising a handle formed on one of the front portion or the back portion.

12. The collapsible colander of claim 10, further comprising a foot formed on the back portion.

13. The collapsible colander of claim 7, further comprising a handle formed on the front portion, the handle being separated from the front portion by one inch or more.

14. The collapsible colander of claim 7, further comprising a handle formed on the front portion, the handle having a length that is at least as long as a height of the front portion from the floor to the rim, whereby only the front portion and the handle contact a horizontal surface upon which a collapsible colander rest.

15. A collapsible container, comprising: a rigid front portion; a rigid back portion; and a collapsible intermediate portion secured between the front portion and the back portion; the front portion, the back portion, and the intermediate portion combining to define an interior volume; a rim defining an upper edge of an open top of the container; a bottom surface opposite the rim; the intermediate portion further being formed from a resilient material and comprising a band extending continuously to form a first portion of the upper edge of the rim, a first sidewall, a portion of the bottom surface of the container, a diametrically opposed second sidewall, and a diametrically opposed second portion of the upper edge of the rim; the collapsible container being selectively configurable between an expanded position and a laterally collapsed position, wherein in the expanded position the front portion is positioned distant from the back portion and in the collapsed position the front portion is relatively closer to the back portion and the intermediate portion is folded upon itself, the rim defining a relatively larger open top of the container in the expanded position than in the collapsed position; wherein the front portion and back portion are configured to shift horizontally into the collapsed position.

16. The collapsible container of claim 15, wherein the collapsible intermediate portion is formed with a first living hinge adjacent the front portion and a second living hinge adjacent the back portion.

17. The collapsible container of claim 15, wherein the front portion and the back portion each form a portion of the bottom surface of the container.

18. The collapsible colander of claim 15, wherein at least one of the front portion or the back portion comprises a plurality of drainage holes.

* * * * *